United States Patent
Endo

(10) Patent No.: US 11,434,403 B2
(45) Date of Patent: Sep. 6, 2022

(54) THERMALLY CONDUCTIVE MEMBER, THERMALLY CONDUCTIVE COMPOSITION, AND METHOD FOR PRODUCING THERMALLY CONDUCTIVE COMPOSITION

(71) Applicant: SEKISUI POLYMATECH CO., LTD., Saitama (JP)

(72) Inventor: Hiroya Endo, Saitama (JP)

(73) Assignee: SEKISUI POLYMATECH CO., LTD., Saitama (JP)

( * ) Notice: Subject to any disclaimer, the term of this patent is extended or adjusted under 35 U.S.C. 154(b) by 901 days.

(21) Appl. No.: 16/303,395

(22) PCT Filed: May 31, 2016

(86) PCT No.: PCT/JP2016/066023
§ 371 (c)(1),
(2) Date: Nov. 20, 2018

(87) PCT Pub. No.: WO2017/208341
PCT Pub. Date: Dec. 7, 2017

(65) Prior Publication Data
US 2020/0270498 A1    Aug. 27, 2020

(51) Int. Cl.
*C09K 5/14* (2006.01)
*B32B 9/00* (2006.01)
(Continued)

(52) U.S. Cl.
CPC .............. *C09K 5/14* (2013.01); *B32B 9/007* (2013.01); *B32B 9/045* (2013.01); *B32B 15/08* (2013.01);
(Continued)

(58) Field of Classification Search
CPC .......... C08L 83/00; C08L 83/04; C08L 83/06; C08L 83/08; C08L 83/14; H01L 23/34; H01L 23/3737
See application file for complete search history.

(56) References Cited

U.S. PATENT DOCUMENTS

| 6,090,879 A | 7/2000 | Takuman et al. |
| 2005/0101719 A1 | 5/2005 | Ishihara |

(Continued)

FOREIGN PATENT DOCUMENTS

| CN | 104169390 A | 11/2014 |
| CN | 105331116 A | 2/2016 |

(Continued)

OTHER PUBLICATIONS

Extended European Search Report dated Jan. 15, 2020, issued by the European Patent Office in corresponding European Application No. 16903969.0-1102, (7 pages).

(Continued)

*Primary Examiner* — Zachary M Davis
(74) *Attorney, Agent, or Firm* — Buchanan, Ingersoll & Rooney PC

(57) ABSTRACT

Provided are a thermally conductive composition that exhibits high adhesive force to an adherend such as a heat-generating element or a heat-dissipating element after curing, and a thermally conductive member in which a cured product of the thermally conductive composition and the adherend are integrated with each other. The thermally conductive composition includes a mixture containing an addition-reaction-type silicone, a thermally conductive filler that includes a metal hydroxide in an amount of 80% by volume or more in terms of volume ratio, and an acryloyl-group-containing silane coupling agent. A thermally conductive member 21 includes a cured body 12 of the ther- (Continued)

mally conductive composition and an adherend 13 fixed to the cured body 12.

10 Claims, 5 Drawing Sheets

(51) Int. Cl.
| | |
|---|---|
| B32B 9/04 | (2006.01) |
| B32B 15/08 | (2006.01) |
| B32B 15/18 | (2006.01) |
| B32B 15/20 | (2006.01) |
| B32B 27/20 | (2006.01) |
| B32B 27/28 | (2006.01) |
| C08J 5/04 | (2006.01) |
| C08K 3/22 | (2006.01) |
| C08K 3/28 | (2006.01) |
| C08K 3/38 | (2006.01) |

(52) U.S. Cl.
CPC .............. *B32B 15/18* (2013.01); *B32B 15/20* (2013.01); *B32B 27/20* (2013.01); *B32B 27/283* (2013.01); *C08J 5/042* (2013.01); *C08K 3/22* (2013.01); *C08K 3/28* (2013.01); *C08K 3/38* (2013.01); *B32B 2307/302* (2013.01); *C08J 2347/00* (2013.01); *C08J 2383/04* (2013.01); *C08K 2003/222* (2013.01); *C08K 2003/2224* (2013.01); *C08K 2003/2227* (2013.01); *C08K 2003/2296* (2013.01); *C08K 2003/282* (2013.01); *C08K 2003/385* (2013.01)

(56) References Cited

U.S. PATENT DOCUMENTS

| | | | |
|---|---|---|---|
| 2009/0214870 A1* | 8/2009 | Morita | ................ H01L 23/3737 |
| | | | 428/413 |
| 2014/0264818 A1 | 9/2014 | Lowe, Jr. et al. | |
| 2015/0008455 A1* | 1/2015 | Tozawa | .............. C08K 5/34924 |
| | | | 257/88 |
| 2015/0097138 A1 | 4/2015 | Kato et al. | |
| 2017/0152408 A1 | 6/2017 | Kirikae et al. | |
| 2018/0230172 A1* | 8/2018 | Furukawa | ............ C09D 183/14 |

FOREIGN PATENT DOCUMENTS

| | | |
|---|---|---|
| JP | H09-316337 A | 12/1997 |
| JP | 2005-146057 A | 6/2005 |
| JP | 2005-162975 A | 6/2005 |
| JP | 2011-006600 A | 1/2011 |
| JP | 2013-127035 A | 6/2013 |
| JP | 2013-189498 A | 9/2013 |
| TW | 201137043 A | 11/2011 |
| WO | 2011/089987 A1 | 7/2011 |
| WO | 2016/031553 A1 | 3/2016 |

OTHER PUBLICATIONS

International Search Report (PCT/ISA/210) dated Jul. 12, 2016, by the Japan Patent Office as the International Searching Authority for International Application No. PCT/JP2016/066023.

Written Opinion (PCT/ISA/237) dated Jul. 12, 2016, by the Japan Patent Office as the International Searching Authority for International Application No. PCT/JP2016/066023.

Office Action (The First Office Action) dated Sep. 27, 2020, by the State Intellectual Property Office of the People's Republic of China in corresponding Chinese Patent Application No. 201680085805.8 and an English Translation of the Office Action. (17 pages).

* cited by examiner

THERMALLY CONDUCTIVE MEMBER, THERMALLY CONDUCTIVE COMPOSITION, AND METHOD FOR PRODUCING THERMALLY CONDUCTIVE COMPOSITION

TECHNICAL FIELD

The present invention relates to a thermally conductive composition to be fixed to a heat-generating element, a heat-dissipating element, or another member and used, method for producing the thermally conductive composition, and a thermally conductive member in which a cured body of a thermally conductive composition is fixed to the heat-generating element, the heat-dissipating element, or the other member.

BACKGROUND ART

In electronic appliances, heat-dissipating elements such as heat sinks are used in order to dissipate heat generated from heat-generating elements such as semiconductor devices mounted on substrates and mechanical parts. For the purpose of enhancing the efficiency of transferring heat to the heat-dissipating elements, heat conductors such as thermally conductive compositions, e.g., thermally conductive grease, thermally conductive sheets, or heat pipes are disposed between the heat-generating elements and the heat-dissipating elements. As such an example, Japanese Unexamined Patent Application Publication No. 2005-146057 (PTL 1) discloses a thermally conductive sheet.

CITATION LIST

Patent Literature

PTL 1: Japanese Unexamined Patent Application Publication No. 2005-146057

SUMMARY OF INVENTION

Technical Problem

However, in the case where a thermally conductive composition or a thermally conductive sheet is disposed between a heat-generating element and a heat-dissipating element to cause the heat-generating element and the heat-dissipating element to closely adhere to each other, the operation of the attachment is not easy because the operation is subjected to various influences such as the positions, the sizes, and the materials of the heat-generating element and the heat-dissipating element.

To address this problem, if a thermally conductive sheet is fixed in advance to one of adherends such as a heat-generating element and a heat-dissipating element, the operation of the attachment of the thermally conductive sheet is facilitated. However, in order to fix the thermally conductive sheet to an adherend in advance, it is necessary to separately cause the thermally conductive sheet to adhere to the adherend with an adhesive or a double-sided adhesive tape therebetween, which may result in degradation of thermal diffusibility. Even if a thermally conductive composition which is in the previous stage of a thermally conductive sheet is applied to an adherend and the thermally conductive composition is cured, the resulting cured product is easily detached from the adherend. Thus, it is difficult to obtain a thermally conductive member in which a thermally conductive sheet is fixed to an adherend in advance.

The present invention has been made in order to solve the problems described above. An object of the present invention is to provide a thermally conductive member in which an adherend such as a heat-generating element or a heat-dissipating element and a thermally conductive sheet are fixed to each other, a thermally conductive composition before fixing to an adherend, and a method for producing the thermally conductive composition.

Solution to Problem

The present invention that achieves the above object has the following features.

Specifically, a thermally conductive composition includes a mixture containing an addition-reaction-type silicone, a thermally conductive filler, and an acryloyl-group-containing silane coupling agent, in which the thermally conductive filler includes a metal hydroxide in an amount of 80% by volume or more of the thermally conductive filler.

Since the thermally conductive composition contains an addition-reaction-type silicone, a thermally conductive filler that includes a metal hydroxide in an amount of 80% by volume or more in terms of volume ratio, and an acryloyl-group-containing silane coupling agent, a thermally conductive member in which a cured body of the thermally conductive composition is unlikely detached from an adherend can be obtained by fixing in advance the thermally conductive composition to the adherend such as a heat-generating element, a heat-dissipating element, or a heat-diffusing member and curing the thermally conductive composition.

In the thermally conductive composition, a cured body obtained by curing the mixture may have a hardness of 60 or less in terms of OO-hardness specified in ASTM D2240.

Since a cured body obtained by curing the mixture has a hardness of 60 or less in terms of OO-hardness specified in ASTM D2240, the cured body is flexible and closely adheres to a heat-generating element or a heat-dissipating element on the side of an object to be attached. Thus, the thermal conductivity can be enhanced.

The thermally conductive composition may contain the silane coupling agent in a ratio of 0.1 to 0.8 parts by mass relative to 100 parts by mass of the addition-reaction-type silicone.

Since the thermally conductive composition contains the acryloyl-group-containing silane coupling agent in a ratio of 0.1 to 0.8 parts by mass relative to 100 parts by mass of the addition-reaction-type silicone, the adhesive force to an adherend becomes higher than that in the case where the thermally conductive composition contains the acryloyl-group-containing silane coupling agent in an amount of less than 0.1 parts by mass or more than 0.8 parts by mass. Thus, a thermally conductive member in which the cured body of the thermally conductive composition is not easily detached from the adherend can be provided.

The present invention further provides a thermally conductive member including a cured body of any of the above-described thermally conductive compositions and an adherend to which the cured body is fixed.

In the thermally conductive member including a cured body of any of the above-described thermally conductive compositions and an adherend to which the cured body is fixed, the combination of the components in the thermally conductive composition suitably interacts with each other to exhibit adhesive force between the thermally conductive composition and the adherend during curing. As a result, a thermally conductive member in which the cured body of the thermally conductive composition and the adherend are strongly adhered to each other can be provided. When the adherend is a heat-generating element, a heat-dissipating element, a heat-diffusing member, or the like, in a step of assembling an electronic appliance, it is possible to omit a step of causing the adherend such as a heat-generating element, a heat-dissipating element, or a heat-diffusing member to closely adhere to the cured body of the thermally conductive composition because the cured body of the thermally conductive composition has been fixed to the adherend in advance. Furthermore, the cured body of the thermally conductive composition is easily disposed on a heat-generating element or a heat-dissipating element, and thus a thermally conductive structure is easily constructed in which the heat-generating element and the heat-dissipating element are connected to each other with the cured body of the thermally conductive composition therebetween. Note that the adherend is required to have heat resistance enough to withstand when the addition-reaction-type silicone in the thermally conductive composition is cured to obtain a cured product.

In the thermally conductive member, the cured body of the thermally conductive composition may have a thin plate-like shape.

Since the cured body of the thermally conductive composition has a thin plate-like shape, this cured body can be used instead of a thermally conductive sheet and can be further used as a convenient, thermally conductive member that has already been adhered to an adherend.

In the thermally conductive member, the cured body of the thermally conductive composition may be formed to be larger than a fixing surface of the adherend.

Since the cured body of the thermally conductive composition is formed to be larger than a fixing surface of the adherend, one of surfaces of the adherend can be covered with the cured body of the thermally conductive composition to enhance the thermal conductivity between the adherend and the cured body of the thermally conductive composition. In addition, the fixing area between the adherend and the cured body of the thermally conductive composition can be made large, and a thermally conductive member having high adhesion can be provided.

In the thermally conductive member, the cured body of the thermally conductive composition may have a covering portion that covers an end portion of the adherend.

Since the cured body of the thermally conductive composition has a covering portion that covers an end portion of the adherend, the end portion of the adherend can be protected. Therefore, when the adherend is an object made of a brittle material, such as a graphite sheet, protection of the adherend can be performed. When the adherend is an object made of an electrically conductive material, such as a metal sheet, unexpected electrical conduction between the adherend and another part is prevented, and a hard end face is covered with the soft cured body to thereby obtain a thermally conductive member having good handleability.

In the thermally conductive member, the cured body of the thermally conductive composition may cover an entire surface of the adherend.

Since the cured body of the thermally conductive composition covers an entire surface of the adherend, the entire surface of the adherend is protected, and heat can be dissipated from the entire surface.

In the thermally conductive member, the adherend may be a heat-dissipating element or heat-diffusing member that is made of graphite, aluminum, copper, or stainless steel.

Since the adherend is a heat-dissipating element or heat-diffusing member that is made of graphite, aluminum, copper, or stainless steel and the graphite, aluminum, copper, and stainless steel can efficiency dissipate heat, a thermally conductive member having good thermal diffusibility can be provided. When the adherend is graphite, the thermally conductive member in which the graphite and the cured body of the thermally conductive composition are fixed to each other in advance has good handleability, durability, and graphite-protecting properties and is extremely useful because the graphite is a material which has poor adhesion to a thermally conductive composition and to which the thermally conductive composition is extremely difficult to adhere, and is a material difficult to be handled due to its brittleness.

The present invention further provides a method for producing a thermally conductive composition, the method including mixing an addition-reaction-type silicone, a thermally conductive filler that includes a metal hydroxide in an amount of 80% by volume or more of the thermally conductive filler, and an acryloyl-group-containing silane coupling agent to produce a thermally conductive composition.

Since the thermally conductive composition is produced by mixing an addition-reaction-type silicone, a thermally conductive filler that includes a metal hydroxide in an amount of 80% by volume or more of the thermally conductive filler, and an acryloyl-group-containing silane coupling agent, a thermally conductive composition having good adhesion to an adherend can be easily obtained.

Advantageous Effects of Invention

According to the thermally conductive member of the present invention, a thermally conductive structure in which a thermally conductive product is disposed between a heat-generating element and a heat-dissipating element can be easily constructed.

According to the thermally conductive composition of the present invention, the thermally conductive composition can be fixed even to an adherend that is difficult to adhere, such as a graphite sheet, with high adhesive force.

BRIEF DESCRIPTION OF DRAWINGS

-FIG. 4A is a plan view of the thermally conductive member, and Sub -FIG. 4B is a front view of the thermally conductive member.

-FIG. 5A is a front view of the thermally conductive member, and Sub -FIG. 5B is a sectional view illustrating a state in which the thermally conductive member is housed in a case.

-FIG. 8A is a plan view of a state in which a release film is attached, and Sub -FIG. 8B is a sectional view taken along line VIIIB-VIIIB in Sub-FIG. 8A.

-FIG. 11A illustrates a case where the adhesive force evaluation is ⊙ or ○, Sub -FIG. 11B illustrates a case where the adhesive force evaluation is Δ, and Sub -FIG. 11C illustrates a case where the adhesive force evaluation is x.

DESCRIPTION OF EMBODIMENTS

Figure 1:
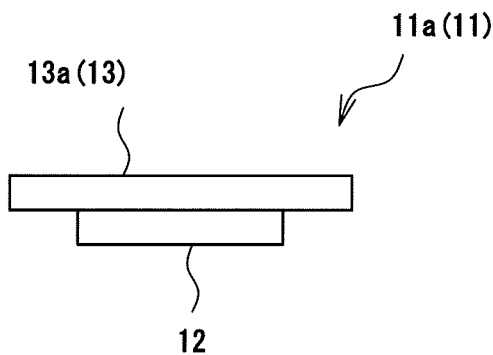
FIG. 1 is a front view of a thermally conductive member according to a first embodiment.

A thermally conductive member and a thermally conductive composition of the present invention will now be described in more detail using embodiments. The thermally conductive member is a member in which a cured body obtained by curing the thermally conductive composition of the present invention (hereinafter, also simply referred to as a "cured body") is fixed to any of a heat-generating element, a heat-dissipating element, and a heat-diffusing member (hereinafter, also referred to as an "adherend"). The thermally conductive composition of the present invention is a composition that contains an addition-reaction-type silicone, a thermally conductive filler that includes a metal hydroxide in an amount of 80% by volume or more of the thermally conductive filler in terms of volume ratio, and an acryloyl-group-containing silane coupling agent.

First, materials contained in this thermally conductive composition will be described.

Addition-Reaction-Type Silicone:

The addition-reaction-type silicone is liquid and is subjected to curing reaction under predetermined conditions to form a rubber-like or gel-like matrix having a crosslinked structure. The addition-reaction-type silicone is easily loaded with a large amount of a thermally conductive filler in the state before the reaction, and therefore, a flexible thermally conductive composition can be obtained.

An example of the addition-reaction-type silicone is a combination of an alkenyl-group-containing polyorganosiloxane and an organohydrogenpolysiloxane. Since a mixture of the two types of organosiloxanes is cured, the alkenyl-group-containing polyorganosiloxane can be used as a main agent and the organohydrogenpolysiloxane can be used as a curing agent. However, the main agent and the curing agent are distinguished from each other by referring to one of at least two components before mixing as a main agent and referring to the other component as a curing agent. Either of the components may be defined as the main agent or the curing agent. Accordingly, a component having a lower mixing ratio or a component having a lower viscosity may be used as the main agent.

A specific example in which the main agent and the curing agent are combined is a combination of two types of mixed compositions containing a main-agent mixed composition obtained by mixing an alkenyl-group-containing polyorganosiloxane, a thermally conductive filler, and a silane coupling agent; and a curing-agent mixed compositions obtained by mixing an organohydrogenpolysiloxane, a thermally conductive filler, and a silane coupling agent.

The addition-reaction-type silicone preferably has a viscosity of 100 to 10,000 mPa·s at room temperature. At a viscosity in the range of 100 to 10,000 mPa·s, a large amount of a thermally conductive filler is loaded, and a cured body having a high thermal conductivity can be obtained. In contrast, at a viscosity of less than 100 mPa·s, since the cohesive force becomes excessively low, the strength of the resulting cured body becomes low, and the adhesive force may also become low. At a viscosity of more than 10,000 mPa·s, it becomes difficult to load a large amount of a thermally conductive filler, and the thermal conductivity may become low.

Thermally Conductive Filler:

Regarding the thermally conductive filler, 80% by volume or more of the total amount of the thermally conductive filler contained in the thermally conductive composition is a metal hydroxide such as aluminum hydroxide or magnesium hydroxide.

When 80% by volume or more of the thermally conductive filler contained is a metal hydroxide, sufficient adhesive force is achieved not only to metal and resin films but also to adherends having poor adhesion, such as a graphite sheet, in the combination of the addition-reaction-type silicone and an acryloyl-group-containing silane coupling agent described later.

Examples of the thermally conductive filler other than metal hydroxides include metals, carbon, metal oxides, metal nitrides, metal carbides, metal hydroxides, graphite, carbon fibers and the like. Examples of the metals include copper, aluminum and the like. Examples of the metal oxides include aluminum oxide, magnesium oxide, zinc oxide, iron oxide, quartz and the like. Examples of the metal nitrides include boron nitride, aluminum nitride and the like. An example of the metal carbide is silicon carbide and the like. Examples of the graphite include a flake graphite powder, spherical graphite and the like. Example of the carbon fibers include graphitized carbon fibers and the like. Such a thermally conductive filler can be oriented in a certain direction in a cured body of the thermally conductive composition, and this orientation is preferred from the viewpoint that the thermal conductivity increases in a direction in which the thermally conductive filler is oriented. When a thermally conductive sheet is required to have voltage endurance, a thermally conductive filler other than a metal and graphite is preferably used.

The thermally conductive filler preferably has an average particle diameter of 0.5 to 50 μm. A thermally conductive filler having an average particle diameter of less than 0.5 μm has a large specific surface area. Thus, the viscosity easily increases, and it is difficult to load a large amount of the thermally conductive filler. On the other hand, even if the average particle diameter exceeds 50 μm, an improvement of the thermal conductivity corresponding to the amount of loading cannot be obtained. However, a thermally conductive filler having an average particle diameter of less than 0.5 μm may be contained in a large amount as long as the loadability is not adversely affected. The average particle diameter of the thermally conductive filler can be indicated by the volume-average particle diameter in a particle size distribution measured by a laser diffraction/scattering method (JIS R 1629).

A plurality of types of thermally conductive fillers having different average particle diameters may be used as the thermally conductive filler.

The thermally conductive filler is preferably added in an amount in the range of 20% to 80% by volume relative to the total volume of the thermally conductive composition. When the amount added is less than 20% by volume, the amount of thermally conductive filler loaded is insufficient, and the thermal conductivity may be degraded. In contrast, when the amount added exceeds 80% by volume, the adhesive force may be degraded. The thermally conductive filler is more preferably added in an amount in the range of 50% to 70% by volume. This is because a thermally conductive composition having both high thermal conductivity and high adhesive force can be obtained in the range of 50% to 70% by volume.

When the thermally conductive composition includes carbon fibers such as graphitized carbon fibers or a flake graphite powder among such thermally conductive fillers, the aspect ratio of the thermally conductive filler preferably exceeds 2. This is because when a thermally conductive filler having an aspect ratio exceeding 2 is oriented in a certain direction in a cured body of the thermally conductive composition, the thermal conductivity in the orientation direction further increases. Here, the aspect ratio of the flake graphite powder is more preferably 5 or more. The aspect ratio of the flake graphite powder refers to the value of "length of long axis of flake surface/thickness (short axis)". With an increase in the aspect ratio of the flake graphite powder, the effect of increasing the thermal conductivity in the orientation direction per unit weight enhances. On the other hand, an excessively high aspect ratio tends to increase the viscosity of the thermally conductive composition. Therefore, the aspect ratio is more preferably in the range of 10 to 1,000.

In contrast, the thermally conductive filler other than carbon fibers such as graphitized carbon fibers and a flat graphite powder preferably has an aspect ratio of 2 or less. This is because when the aspect ratio exceeds 2, the viscosity tends to increase, and it is difficult to load the thermally conductive filler in a large amount. Accordingly, the shape of the thermally conductive filler made of a metal, a metal oxide, a metal nitride, a metal carbide, or a metal hydroxide is preferably a circular shape.

The fiber diameter of the carbon fibers is preferably 5 to 20 μm. When the fiber diameter is in the range of 5 to 20 μm, industrial production of the carbon fibers can be easily performed, and the thermal conductivity is easily increased. In contrast, when the fiber diameter is smaller than 5 μm or larger than 20 μm, the productivity decreases.

The average fiber length of the carbon fibers is preferably 10 to 600 μm, and more preferably 80 to 500 μm. When the average fiber length is smaller than 10 μm, the thermal conductivity may be degraded. In contrast, when the average fiber length is larger than 600 μm, the carbon fibers become bulky, and it becomes difficult to load the matrix with a large amount of carbon fibers. Note that the average fiber length can be calculated from a particle size distribution obtained by observing the carbon fibers with a microscope.

The average fiber length of the carbon fibers is preferably 40% or less of the thickness of the cured body obtained by curing the thermally conductive composition, and the content of the carbon fibers having a fiber length exceeding 80% of the thickness is preferably 5% by mass or less. This is because when the content of the carbon fibers having a fiber length exceeding 80% of the thickness exceeds 5% by mass and the cured body of the thermally conductive composition is compressed, the number of carbon fibers that exceed the compressed thickness becomes large. On the other hand, as long as the average fiber length of the carbon fibers is 50% or less of the thickness, the amount of the carbon fibers larger than the thickness can be decreased even when the cured body is compressed. Considering these concerns, the particle size distribution of the carbon fibers is preferably narrow. From the viewpoint of increasing the thermal conductivity, it is preferable to use a mixture of a plurality of types of carbon fibers having different particle size distributions.

The flake graphite powder contains a plate-like graphite powder having a shape also called, for example, a flat shape. The graphite crystal planes in the flake graphite powder extend in the surface direction, and the flake graphite powder isotropically has extremely high thermal conductivity within the surface. Therefore, the thermal conductivity in the thickness direction of a sheet can be increased by orienting the surface directions of the flake surfaces in the thickness direction of the sheet. In contrast, the normal directions with respect to the flake surfaces are randomly oriented. Thus, the sheet is configured not to exhibit anisotropy but to conduct heat isotropically in the direction in which the sheet extends.

Examples of the flake graphite powder include natural graphite and artificial graphite. A flake graphite powder prepared by thermally decomposing a polymer film and crushing the resulting artificial graphite sheet is preferably used. According to this flake graphite powder, the thermal conductivity in the sheet surface direction can be increased. The polymer film used as a raw material for graphitization is preferably formed of an aromatic polymer such as polyimide. This is because a graphite film having a developed graphite structure and high thermal conductivity can be obtained.

The flake graphite powder preferably has an average particle diameter in the range of 10 to 400 μm. At an average particle diameter of less than 10 μm, the viscosity increases significantly, and the properties are difficult to improve. At an average particle diameter exceeding 400 μm, detachment from the sheet becomes significant.

Acryloyl-Group-Containing Silane Coupling Agent:

Examples of a typical silane coupling agent include silane coupling agents having a structure in which three bonds bonded to Si are each a methoxy group or an ethoxy group and a substituent is bonded to the residual bond. Examples of the substituent include alkyl groups having various numbers of carbon atoms, a vinyl group, an epoxy group, an amino group, a mercapto group, an anilino group, an isocyanate group, and an acryloyl group. Among these various silane coupling agents, an acryloyl-group-containing silane coupling agent is used. This is because the use of the acryloyl-group-containing silane coupling agent increases the adhesive force with respect to the combination of the addition-reaction-type silicone and the specific thermally conductive filler described above.

The amount of the acryloyl-group-containing silane coupling agent blended is preferably 0.1 to 0.8 parts by mass, and more preferably 0.15 to 0.6 parts by mass relative to 100 parts by mass of the addition-reaction-type silicone. This is because the adhesive force to the adherend becomes low when the amount is less than 0.1 parts by mass or exceeds 0.8 parts by mass. In general, in the case where a silane coupling agent is added in order to enhance dispersibility of a solid substance in a liquid substance, the silane coupling agent is added in an amount of about 1.0 to 20 parts by mass so as to correspond to the content of the solid substance. This is because the purpose is to perform a surface treatment of the solid substance. However, such an addition of a large amount of a silane coupling agent is not preferable because the effect of enhancing the adhesive force to an adherend is not exhibited, and the adhesive force may be decreased on the contrary.

Additives:

The thermally conductive composition can contain various additives for the purpose of enhancing various properties such as productivity, weather resistance, and heat resistance. Examples of the additives include various functionality improvers such as a plasticizer, a reinforcing agent, a coloring agent, a heat resistance improver, a flame retardant, a catalyst, a hardening retarder, and a deterioration inhibitor.

Production of Thermally Conductive Composition:

To produce the thermally conductive composition, a thermally conductive filler, an acryloyl-group-containing silane coupling agent, and other necessary additives are added to an addition-reaction-type silicone, and the resulting mixture is sufficiently stirred and dispersed. In the case where the addition-reaction-type silicone is cured by mixing a main agent and a curing agent thereof, the thermally conductive filler and the other components can be dispersed in either the main agent or the curing agent or both the main agent and the curing agent, and the thermally conductive composition is prepared by mixing the main agent and the curing agent.

Properties of Thermally Conductive Composition:

The thermally conductive composition containing the above components is preferably a liquid or putty-like composition having a viscosity of about 10 to 1,000 Pa·s at room temperature. The thermally conductive composition is applied to an adherend and heated to a curing temperature of the addition-reaction-type silicone to cure the addition-reaction-type silicone. Thus, the thermally conductive composition can be fixed to the adherend. At a viscosity less than 10 Pa·s, the thermally conductive filler may settle, and the thermal conductivity may become low because the amount of the thermally conductive filler blended is small. In contrast, at a viscosity exceeding 1,000 Pa·s, it is difficult to produce the thermally conductive composition so that the thermally conductive filler is sufficiently dispersed.

In order to orient a thermally conductive filler having a high aspect ratio by applying a magnetic field, the viscosity of the thermally conductive composition is preferably 10 to 500 Pa·s at room temperature. The reason for this is as follows. At a viscosity less than 10 Pa·s, the thermally conductive filler may settle during the step of orientation. At a viscosity exceeding 500 Pa·s, the flowability is so low that the thermally conductive filler does not orient or it takes an excessively long time to orient the thermally conductive filler. However, the viscosity can be controlled to less than 10 Pa·s in some cases by using a thermally conductive filler that does not easily settle or by combining an additive such as an antisettling agent. Examples of the magnetic line generation source used in magnetic field orientation include a superconducting magnet, a permanent magnet, an electromagnet, and a coil. A superconducting magnet is preferred because it can generate a magnetic field having a high magnetic flux density. The magnetic flux density of the magnetic field generated from each of these magnetic line generation sources is preferably 1 to 30 tesla. When the magnetic flux density is less than 1 tesla, it becomes difficult to orient the thermally conductive filler. In contrast, a magnetic flux density exceeding 30 tesla is difficult to practically obtain.

The thermally conductive composition can be easily applied to an adherend. The addition-reaction-type silicone is subsequently cured at a curing temperature of the addition-reaction-type silicone to obtain a thermally conductive member in which a cured body of the thermally conductive composition and the adherend are integrated with each other. The details will be described later.

Note that the thermally conductive composition can be used so as to construct a thermally conductive structure in which the thermally conductive composition is cured between a heat-generating element and a heat-dissipating element by applying the thermally conductive composition between the heat-generating element and the heat-dissipating element instead of producing a thermally conductive member described later.

Adherend:

The adherend is an object to which a thermally conductive composition is fixed. The adherend can be any of a heat-generating element, a heat-dissipating element, and a heat-diffusing member. Alternatively, the adherend may be, for example, a part other than the above.

The heat-generating element is, for example, a part that generates heat in an electronic appliance. Examples thereof include IC chips, power semiconductors, batteries, and motors. The heat-dissipating element is, for example, a part that contributes to diffusion of heat generated from this heat-generating element. Examples thereof include heat sinks and housings of electronic appliances. The heat-diffusing member is, for example, a part disposed at a position at which heat generation occurs locally, a position at which a heat generation source comes in contact with the human body, or the like and disposed separately from the heat-dissipating element for the purpose of eliminating a heat spot. Examples thereof include graphite sheets, metal sheets made of copper or the like, and heat pipes. However, the heat-diffusing member is not strictly distinguished from the heat-dissipating element, and the heat-diffusing member can also function as the heat-dissipating element in some cases.

Examples of the parts and the like other than the heat-generating element, the heat-dissipating element, and the heat-diffusing member include resin molded articles for enabling a cured body of the thermally conductive composition to be positioned between a heat-generating element and a heat-dissipating element so that the cured body is easily arranged therebetween, various parts used in electronic appliances, and housings of electronic appliances.

There are various purposes of use, shapes, sizes, etc. of the adherends. A graphite sheet, which is used as a heat-diffusing member, is a material which has an inactive surface and to which a cured body of a thermally conductive composition is difficult to closely adhere. However, even a material and a shape having poor adhesion, such as a graphite sheet, can be suitably selected as the adherend. Among these adherends, a heat sink, which is a heat-dissipating element, is preferably made of a material such as aluminum, copper, or stainless, and more preferably made of aluminum from the viewpoint of thermal conductivity, weather resistance, and the cost. The heat-diffusing member is preferably made of copper or graphite, which has a high thermal conductivity.

Production of Thermally Conductive Member:

The production of a thermally conductive member will be described.

To produce a thermally conductive member, the thermally conductive composition described above is poured into a predetermined mold. An adherend is inserted into the mold or brought into close contact with an opening of the mold so that the thermally conductive composition before solidification and the adherend are brought into contact with each other. When a thermally conductive filler, such as carbon fibers or a flake graphite powder, whose degree of orientation affects the thermal conductivity is contained, the carbon fibers or the flake graphite powder is oriented in a desired direction by, for example, applying a magnetic field. In order to orient the carbon fibers or the like by magnetic field orientation, the viscosity of the thermally conductive composition is preferably 10 to 500 Pa·s at room temperature. The reason for this is as follows. At a viscosity less than 10 Pa's, the carbon fibers or the like or the thermally conductive filler other than carbon fibers may settle. At a viscosity exceeding 500 Pa's, since the flowability is excessively low, the carbon fibers or the like are not oriented by a magnetic field or it takes an excessively long time to orient the carbon fibers or the like. However, the viscosity can be controlled to less than 10 Pa·s in some cases by using a thermally conductive filler that does not easily settle or by combining an additive such as an antisettling agent.

Examples of the magnetic line generation source for applying a magnetic line include a superconducting magnet, a permanent magnet, an electromagnet, and a coil. A superconducting magnet is preferred because it can generate a magnetic field having a high magnetic flux density. The magnetic flux density of the magnetic field generated from each of these magnetic line generation sources is preferably 1 to 30 tesla. When the magnetic flux density is less than 1 tesla, it becomes difficult to orient the carbon fibers or the like. In contrast, a magnetic flux density exceeding 30 tesla is difficult to practically obtain.

When carbon fibers or the like are contained, the subsequent step of curing an addition-reaction-type silicone is performed while the oriented state is maintained. When carbon fibers or the like are not contained, the step of orientation is omitted, and the subsequent step of curing an addition-reaction-type silicone is performed. This step is performed by heating the thermally conductive composition to a curing temperature of the addition-reaction-type silicone. After the addition-reaction-type silicone is cured, the resulting product is removed from the mold to obtain a thermally conductive member in which a cured body of the thermally conductive composition and the adherend closely adhere to each other.

The carbon fibers or the like can be oriented by extrusion molding instead of applying the magnetic field. This is because, in extrusion molding, the carbon fibers or the like can be oriented in the direction in which the thermally conductive composition flows during extrusion molding by utilizing the properties of fluid flow orientation. Alternatively, the carbon fibers or the like can be oriented in a coating direction by applying and spreading the thermally conductive composition with, for example, a slit coater to form a thin film. In a state in which the thin-film oriented sheet obtained as described above is caused to adhere to the adherend, the addition-reaction-type silicone is cured to obtain a thermally conductive member.

By slicing the thermally conductive member at a plane substantially perpendicular to the orientation direction of the carbon fibers or the like, a cured body of the thermally conductive composition is obtained in which the carbon fibers or the like are oriented in the thickness direction. Various cutting means such as a blade, a wire rod, and a laser can be used as slicing means. A shear blade, a push-cutting blade, a plane, or the like can be used as the blade.

Cured body of thermally conductive composition:

The cured body of the thermally conductive composition preferably has a hardness of OO60 or less, the hardness being specified in ASTM D2240. Such a flexible cured body having a hardness of OO60 or less comes in close contact with a member which comes in contact after curing, and thus the thermal conductivity can be increased. However, when the hardness exceeds OO60, the adhesive force may decrease. The lower limit of the hardness is preferably OO10 or more. When the hardness is less than OO10, the strength of the cured body of the thermally conductive composition decreases, and cohesive failure may easily occur.

Properties of Thermally Conductive Member:

According to the thermally conductive member described above, since the cured body of the thermally conductive composition is fixed directly to an adherend without another layer such as an adhesive layer therebetween, the thermal conductivity between the cured body and the adherend can be enhanced. In the related art, in a step of assembling an electronic appliance, a thermally conductive composition, a thermally conductive sheet, or the like is attached to each of a heat-generating element and a heat-dissipating element. In contrast, once a thermally conductive member in which the cured body of the thermally conductive composition is fixed to one of a heat-generating element and a heat-dissipating element is prepared, attachment of the thermally conductive member can be completed simply by performing a single step of attaching the thermally conductive member prepared above to the other of the heat-generating element and the heat-dissipating element. Thus, the man-hour of assembling can be reduced.

In the thermally conductive member, since the cured body of the thermally conductive composition is strongly fixed to an adherend such as a heat-generating element or a heat-dissipating element, the cured body of the thermally conductive composition is unlikely to detach during the transportation of the resulting product or an attachment operation to another adherend. Meanwhile, adhesion of a portion formed by afterwards bringing the cured body of the thermally conductive member into contact with the other of the heat-generating element and the heat-dissipating element is not as strong as adhesion of a portion that is fixed in advance. Accordingly, when the cured body and the element are separated from each other for replacement repair or failure repair of parts, the portion that is fixed afterwards is easily separated and can be easily reused.

Embodiments of Thermally Conductive Member

Figure 2:
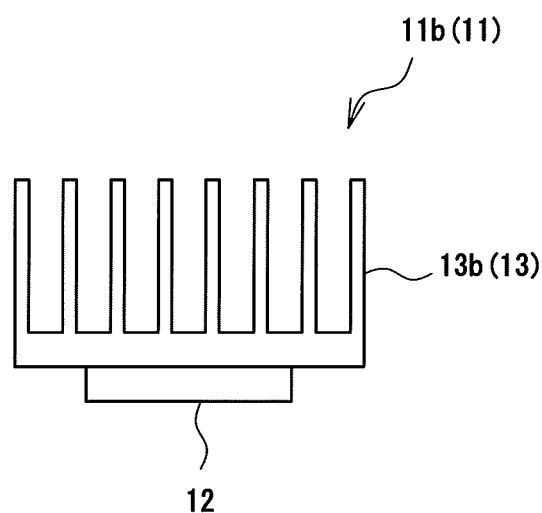
FIG. 2 is a front view of a thermally conductive member according to a modification of the first embodiment.
Figure 3:
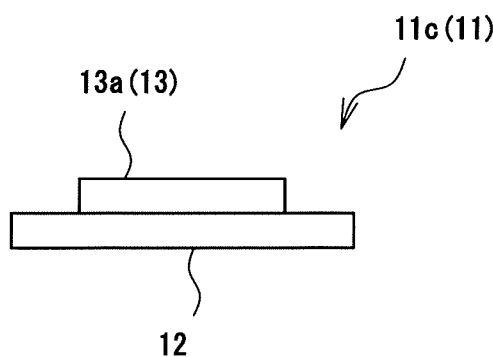
FIG. 3 is a front view of a thermally conductive member according to another modification of the first embodiment.

First Embodiment (FIGS. 1 to 3)

In a thermally conductive member 11 illustrated as a first embodiment, a cured body 12 of a thermally conductive composition is formed to have a sheet shape (or a thin-film shape) and stacked on an adherend 13 such as a heat-generating element, a heat-dissipating element, or a heat-diffusing member fixed to the cured body 12.

In a thermally conductive member 11a (11) illustrated in FIG. 1, a cured body 12 of a thermally conductive composition adheres to an adherend 13 such as a metal sheet 13a serving as a thin plate-like heat-diffusing member. In a thermally conductive member 11b (11) illustrated in FIG. 2, a heat-dissipating element 13b such as a heat sink is applied to the adherend 13, and the heat-dissipating element 13b adheres to a cured body 12 of a thermally conductive composition. Furthermore, a thermally conductive member 11c (11) illustrated in FIG. 3 is the same as the thermally conductive member 11a in that a cured body 12 of a thermally conductive composition adheres to a thin plate-like adherend 13 but differs from the thermally conductive member 11a in that the cured body 12 of the thermally conductive composition is formed slightly larger than the adherend 13 in plan view.

The thermally conductive members 11a and 11c can overcome shortcomings such as the ease of detachment of the metal sheet 13a compared with the case where the metal sheet 13a is attached alone, and fixability, durability, and handleability can be enhanced by handling as an integrated product 11 of the adherend 13 and the cured product 12.

An example of use of the thermally conductive member will be described on the basis of the thermally conductive member 11a. The thermally conductive member 11a in which the cured product 12 of the thermally conductive composition is fixed to the metal sheet 13a is disposed such that the cured product 12 side of the thermally conductive member 11a is fixed to one of a heat-generating element and a heat-dissipating element, and the metal sheet 13a side is in contact with the other of the heat-generating element and the heat-dissipating element. In this embodiment, since the metal sheet 13a is fixed to the cured body 12 of the thermally conductive composition, and the cured body 12 is fixed to the one of the heat-generating element and the heat-dissipating element, the metal sheet 13a is unlikely to detach. Thus, this embodiment can be suitably used in an application in which the metal sheet 13a and the other of the heat-generating element and the heat-dissipating element are slid against each other at the contact surface.

The cured body 12 of the thermally conductive composition can have a hardness of 60 or less in terms of OO-hardness. Since such a cured body 12 flexibly deforms, close contact between the metal sheet 13a and the other of the heat-generating element and the heat-dissipating element can be made reliable. In addition, application of an excessively high pressure to the metal sheet 13a can be suppressed by reducing the pressure applied to the metal sheet 13a during sliding. Thus, wear of the metal sheet 13a can be suppressed while reducing the frictional force.

Figure 4A:
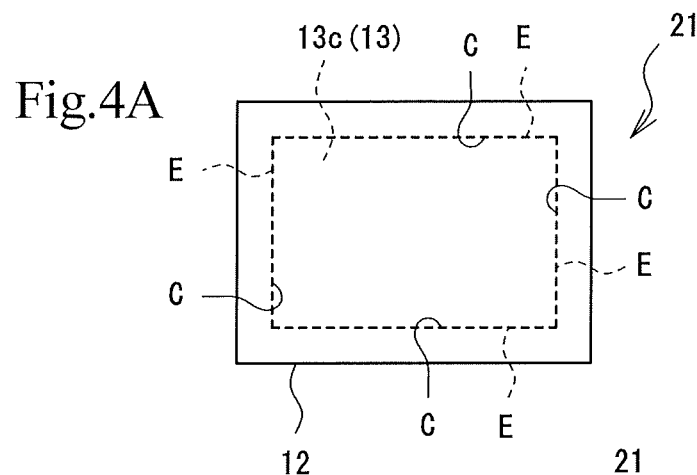
FIGS. 4A and 4B illustrates a thermally conductive member according to a second embodiment, Sub
Figure 4B:
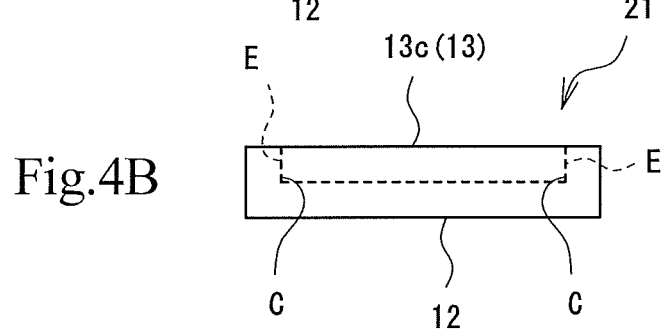

Second Embodiment (FIG. 4)

In a thermally conductive member 21 according to a second embodiment, a cured body 12 of a thermally conductive composition is formed slightly larger than an adherend 13 in plan view, and an end portion E of the adherend 13 is covered with the cured body 12, as illustrated in FIG. 4. A portion of the cured body 12, the portion covering the adherend 13, is a covering portion C. This embodiment can be suitably applied when the adherend 13 is made of a material that has poor adhesion to other substances and that is brittle, such as a graphite sheet 13c serving as a heat-diffusing member.

Third Embodiment (FIG. 5)

Figure 5A:
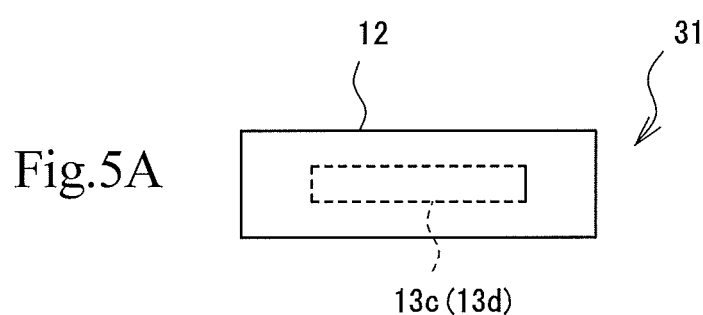
FIGS. 5A and 5B illustrates a thermally conductive member according to a third embodiment, Sub

FIG. 5A illustrates a thermally conductive member 31 according to a third embodiment. The thermally conductive member 31 is formed so that the entire surfaces of an adherend 13 are covered with a cured body 12 of a thermally conductive composition.

This configuration can be suitably applied when the adherend 13 is made of, for example, a material that is easily corroded or a brittle material, such as a graphite sheet 13c. Thus, breakage and corrosion of the adherend 13 can be suppressed. In addition, this configuration can be suitably applied when the adherend 13 is, for example, a heat-generating element 13d, and heat from the heat-generating element 13d easily diffuses in all directions.

Figure 5B:
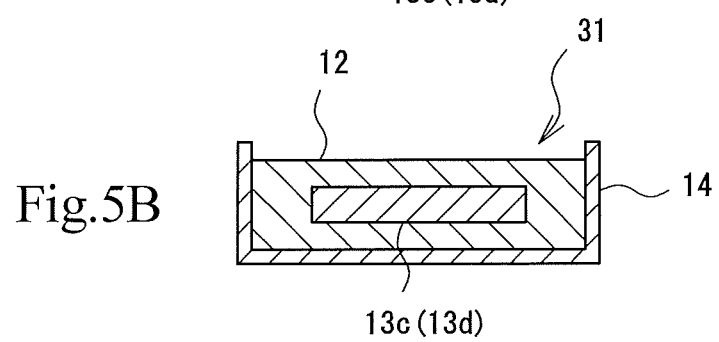

An example of use of the thermally conductive member 31 will be described. As illustrated in FIG. 5B, for example, when a heat-generating element 13d is disposed in a case 14 such as a housing of an electronic appliance, the heat-generating element 13d is sealed by being covered with a cured body 12 of a thermally conductive composition, and this cured body 12 is brought into close contact with the case 14. By constructing a thermally conductive structure in this manner, breakage and corrosion of the heat-generating element 13 are suppressed, and heat generated from the heat-generating element 13 can be effectively diffused.

Figure 6:
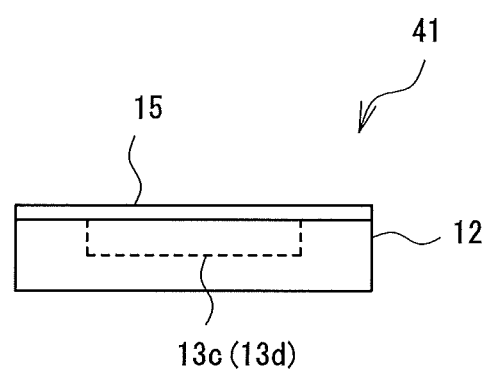
FIG. 6 is a front view of a thermally conductive member according to a fourth embodiment.

Fourth Embodiment (FIG. 6)

FIG. 6 illustrates a thermally conductive member 41 according to a fourth embodiment. The thermally conductive member 41 is configured so that an adherend 13 is covered with a cured body 12 of a thermally conductive composition and a protective member 15 such as a resin film. This configuration is also suitably applicable to a case where the adherend 13 is a graphite sheet 13c or a heat-generating element 13d.

An example of the protective member 15 used in the thermally conductive member 41 is a release film. When a release film is provided and the thermally conductive member 41 is attached to a heat-generating element or a heat-dissipating element, this release film is removed, the surface of the adherend 13 is brought into close contact with the heat-generating element or the heat-dissipating element, and the cured body 12 of the thermally conductive composition can be applied to the heat-generating element or the heat-dissipating element. With this configuration, breakage and corrosion of the adherend 13 can be suppressed by covering the adherend 13, and thermal diffusion can be sufficiently performed by bringing the adherend 13 into direct contact with the heat-generating element or the heat-dissipating element. Examples of the release film include fluororesin films and resin films having a fluorine-based release layer.

Figure 7:
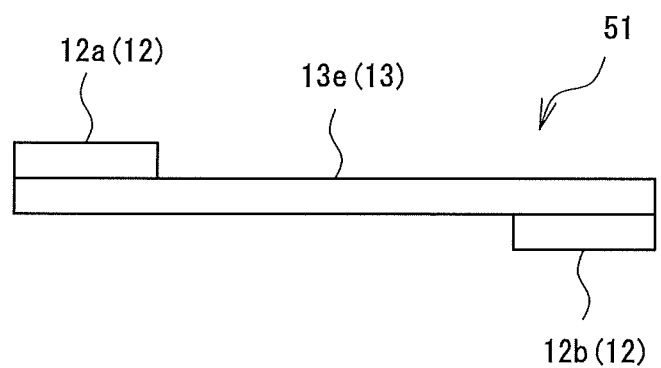
FIG. 7 is a front view of a thermally conductive member according to a fifth embodiment.

Fifth Embodiment (FIG. 7)

In a thermally conductive member 51 according to a fifth embodiment, cured bodies 12 of a thermally conductive composition are fixed to a plurality of portions of an adherend 13, the portions being apart from each other, as illustrated in FIG. 7. With this configuration, when the adherend 13 is a heat-diffusing member 13e, the heat-diffusing member 13e can be easily disposed between a heat-generating element and a heat-dissipating element by performing a single step of attaching the heat-diffusing member 13e having a predetermined size and a predetermined shape. Specifically, a cured body 12a of the thermally conductive composition is disposed on a portion that contacts a heat-generating element, and a cured body 12b of the thermally conductive composition is disposed on a portion that contacts a heat-dissipating element to thereby enhance the thermal conductivity between the heat-generating element and the heat-diffusing member 13e and between the heat-diffusing member 13e and the heat-dissipating element.

EXAMPLES

Preparation of Thermally Conductive Compositions of Samples 1 to 39:

A thermally conductive composition of Sample 1 was prepared by sufficiently mixing 50 parts by mass of an addition-reaction-type silicone serving as a main agent, 50 parts by mass of an addition-reaction-type silicone serving as a curing agent, 95 parts by mass of carbon fibers (average fiber length: 100 μm), and 0.3 parts by mass of 3-acryloxy-propyltrimethoxysilane serving as an acryloyl-group-containing silane coupling agent.

Thermally conductive compositions of Samples 2 to 39 were prepared as in Sample 1 by sufficiently mixing raw materials except that the raw materials and the composition (parts by mass) were changed to those shown in Tables 1 to 4.

TABLE 1

|  | Sample 1 | Sample 2 | Sample 3 | Sample 4 | Sample 5 | Sample 6 | Sample 7 | Sample 8 | Sample 9 | Sample 10 |
|---|---|---|---|---|---|---|---|---|---|---|
| (Polymer matrix) | — | — | — | — | — | — | — | — | — | — |
| Addition-reaction-type silicone | 100 | 100 | 100 | 100 | 100 | 100 | 100 | 100 | 100 | 100 |
| Addition-reaction-type polyisobutylene | — | — | — | — | — | — | — | — | — | — |
| (Thermally conductive filler) | — | — | — | — | — | — | — | — | — | — |
| Carbon fiber | 95 | — | — | — | — | — | — | — | — | — |
| Flake graphite | — | 55 | — | — | — | — | — | — | — | — |
| Aluminum | — | — | 115 | — | — | — | — | — | — | — |
| Aluminum hydroxide | — | — | — | 105 | — | — | — | — | — | — |
| Magnesium hydroxide | — | — | — | — | 100 | — | — | — | — | — |
| Aluminum oxide | — | — | — | — | — | 170 | — | — | — | — |
| Magnesium oxide | — | — | — | — | — | — | 160 | — | — | — |
| Zinc oxide | — | — | — | — | — | — | — | 240 | — | — |
| Aluminum nitride | — | — | — | — | — | — | — | — | 140 | — |
| Boron nitride | — | — | — | — | — | — | — | — | — | 100 |
| (Silane coupling agent) | — | — | — | — | — | — | — | — | — | — |
| Acryloyl group | 0.3 | 0.3 | 0.3 | 0.3 | 0.3 | 0.3 | 0.3 | 0.3 | 0.3 | 0.3 |
| Methacryloyl group | — | — | — | — | — | — | — | — | — | — |
| Vinyl group | — | — | — | — | — | — | — | — | — | — |
| Decyl group | — | — | — | — | — | — | — | — | — | — |
| Isocyanate group | — | — | — | — | — | — | — | — | — | — |
| Amino group | — | — | — | — | — | — | — | — | — | — |
| Mercapto group | — | — | — | — | — | — | — | — | — | — |
| Epoxy group | — | — | — | — | — | — | — | — | — | — |
| Anilino group | — | — | — | — | — | — | — | — | — | — |
| Material of object to be adhered | Graphite | Graphite | Graphite | Graphite | Graphite | Graphite | Graphite | Graphite | Graphite | Graphite |
| Evaluation results of adhesive force | X | X | X | ⊙ | ⊙ | X | X | X | X | X |

TABLE 2

|  | Sample 11 | Sample 12 | Sample 13 | Sample 14 | Sample 15 | Sample 16 | Sample 17 | Sample 18 | Sample 19 | Sample 20 |
|---|---|---|---|---|---|---|---|---|---|---|
| (Polymer matrix) | — | — | — | — | — | — | — | — | — | — |
| Addition-reaction-type silicone | 100 | 100 | 100 | 100 | 100 | 100 | 100 | 100 | 100 | — |
| Addition-reaction-type polyisobutylene | — | — | — | — | — | — | — | — | — | 100 |
| (Thermally conductive filler) | — | — | — | — | — | — | — | — | — | — |
| Carbon fiber | — | — | — | — | — | — | — | — | — | — |
| Flake graphite | — | — | — | — | — | — | — | — | — | — |
| Aluminum | — | — | — | — | — | — | — | — | — | — |
| Aluminum hydroxide | 93 | 83 | 252 | 216 | 180 | 144 | 108 | 72 | 36 | 105 |
| Magnesium hydroxide | — | — | — | — | — | — | — | — | — | — |
| Aluminum oxide | 17 | 34 | 176 | 234 | 293 | 351 | 410 | 468 | 527 | — |
| Magnesium oxide | — | — | — | — | — | — | — | — | — | — |
| Zinc oxide | — | — | — | — | — | — | — | — | — | — |
| Aluminum nitride | — | — | — | — | — | — | — | — | — | — |
| Boron nitride | — | — | — | — | — | — | — | — | — | — |
| (Silane coupling agent) | — | — | — | — | — | — | — | — | — | — |
| Acryloyl group | 0.3 | 0.3 | 0.3 | 0.3 | 0.3 | 0.3 | 0.3 | 0.3 | 0.3 | 0.3 |
| Methacryloyl group | — | — | — | — | — | — | — | — | — | — |
| Vinyl group | — | — | — | — | — | — | — | — | — | — |
| Decyl group | — | — | — | — | — | — | — | — | — | — |
| Isocyanate group | — | — | — | — | — | — | — | — | — | — |
| Amino group | — | — | — | — | — | — | — | — | — | — |
| Mercapto group | — | — | — | — | — | — | — | — | — | — |
| Epoxy group | — | — | — | — | — | — | — | — | — | — |
| Anilino group | — | — | — | — | — | — | — | — | — | — |
| Material of object to be adhered | Graphite | Graphite | Graphite | Graphite | Graphite | Graphite | Graphite | Graphite | Graphite | Graphite |
| Evaluation results of adhesive force | ⊙ | ○ | X | X | X | X | X | X | X | X |

TABLE 3

| | Sample 21 | Sample 22 | Sample 23 | Sample 24 | Sample 25 | Sample 26 | Sample 27 | Sample 28 | Sample 29 | Sample 30 | Sample 31 |
|---|---|---|---|---|---|---|---|---|---|---|---|
| (Polymer matrix) | — | — | — | — | — | — | — | — | — | — | — |
| Addition-reaction-type silicone | 100 | 100 | 100 | 100 | 100 | 100 | 100 | 100 | 100 | 100 | 100 |
| Addition-reaction-type polyisobutylene | — | — | — | — | — | — | — | — | — | — | — |
| (Thermally conductive filler) | — | — | — | — | — | — | — | — | — | — | — |
| Carbon fiber | — | — | — | — | — | — | — | — | — | — | — |
| Flake graphite | — | — | — | — | — | — | — | — | — | — | — |
| Aluminum | — | — | — | — | — | — | — | — | — | — | — |
| Aluminum hydroxide | 105 | 105 | 105 | 105 | 105 | 105 | 105 | 105 | 60 | 560 | 950 |
| Magnesium hydroxide | — | — | — | — | — | — | — | — | — | — | — |
| Aluminum oxide | — | — | — | — | — | — | — | — | — | — | — |
| Magnesium oxide | — | — | — | — | — | — | — | — | — | — | — |
| Zinc oxide | — | — | — | — | — | — | — | — | — | — | — |
| Aluminum nitride | — | — | — | — | — | — | — | — | — | — | — |
| Boron nitride | — | — | — | — | — | — | — | — | — | — | — |
| (Silane coupling agent) | — | — | — | — | — | — | — | — | — | — | — |
| Acryloyl group | — | — | — | — | — | — | — | — | 0.3 | 0.3 | 0.3 |
| Methacryloyl group | 0.3 | — | — | — | — | — | — | — | — | — | — |
| Vinyl group | — | 0.3 | — | — | — | — | — | — | — | — | — |
| Decyl group | — | — | 0.3 | — | — | — | — | — | — | — | — |
| Isocyanate group | — | — | — | 0.3 | — | — | — | — | — | — | — |
| Amino group | — | — | — | — | 0.3 | — | — | — | — | — | — |
| Mercapto group | — | — | — | — | — | 0.3 | — | — | — | — | — |
| Epoxy group | — | — | — | — | — | — | 0.3 | — | — | — | — |
| Anilino group | — | — | — | — | — | — | — | 0.3 | — | — | — |
| Material of object to be adhered | Graphite | Graphite | Graphite | Graphite | Graphite | Graphite | Graphite | Graphite | Graphite | Graphite | Graphite |
| Evaluation results of adhesive force | Δ | X | X | Δ | X | X | X | X | ◉ | ◉ | ○ |

TABLE 4

| | Sample 32 | Sample 33 | Sample 34 | Sample 35 | Sample 36 | Sample 37 | Sample 38 | Sample 39 |
|---|---|---|---|---|---|---|---|---|
| (Polymer matrix) | — | — | — | — | — | — | — | — |
| Addition-reaction-type silicone | 100 | 100 | 100 | 100 | 100 | 100 | 100 | 100 |
| Addition-reaction-type polyisobutylene | — | — | — | — | — | — | — | — |
| (Thermally conductive filler) | — | — | — | — | — | — | — | — |
| Carbon fiber | — | — | — | — | — | — | — | — |
| Flake graphite | — | — | — | — | — | — | — | — |
| Aluminum | — | — | — | — | — | — | — | — |
| Aluminum hydroxide | 105 | 105 | 105 | 105 | 105 | 105 | 105 | 105 |
| Magnesium hydroxide | — | — | — | — | — | — | — | — |
| Aluminum oxide | — | — | — | — | — | — | — | — |
| Magnesium oxide | — | — | — | — | — | — | — | — |
| Zinc oxide | — | — | — | — | — | — | — | — |
| Aluminum nitride | — | — | — | — | — | — | — | — |
| Boron nitride | — | — | — | — | — | — | — | — |
| (Silane coupling agent) | — | — | — | — | — | — | — | — |
| Acryloyl group | 0.1 | 0.15 | 0.6 | 0.8 | 0.3 | 0.3 | 0.3 | — |
| Methacryloyl group | — | — | — | — | — | — | — | — |
| Vinyl group | — | — | — | — | — | — | — | — |
| Decyl group | — | — | — | — | — | — | — | — |
| Isocyanate group | — | — | — | — | — | — | — | — |
| Amino group | — | — | — | — | — | — | — | — |
| Mercapto group | — | — | — | — | — | — | — | — |
| Epoxy group | — | — | — | — | — | — | — | — |
| Anilino group | — | — | — | — | — | — | — | — |
| Material of object to be adhered | Graphite | Graphite | Graphite | Graphite | Aluminum | Stainless steel | Copper | Graphite |
| Evaluation results of adhesive force | ○ | ◉ | ◉ | ○ | ◉ | ◉ | ◉ | X |

The raw materials shown in the tables are as follows.

The addition-reaction-type silicone has a specific gravity of 0.98, and the tables show the total parts by mass of the addition-reaction-type silicone prepared by mixing an addition-reaction-type silicone serving as a main agent and an addition-reaction-type silicone serving as a curing agent in equal amounts (parts by mass).

The addition-reaction-type polyisobutylene has a specific gravity of 0.92, and the tables show the total parts by mass of the addition-reaction-type polyisobutylene prepared by mixing an addition-reaction-type polyisobutylene serving as a main agent and an addition-reaction-type polyisobutylene serving as a curing agent in equal amounts (parts by mass).

The flake graphite has an average particle diameter of 130 μm, an aspect ratio of about 10, and a specific gravity of 2.23.

The aluminum is a powder having a spherical shape, an average particle diameter of 20 μm, and a specific gravity of 2.70.

The aluminum hydroxide is a powder having a crushed shape, an average particle diameter of 10 μm, and a specific gravity of 2.42.

The magnesium hydroxide is a powder having an irregular shape, an average particle diameter of 3.5 μm, and a specific gravity of 2.36.

The aluminum oxide is a powder having a spherical shape, an average particle diameter of 20 μm, and a specific gravity of 3.98.

The magnesium oxide is a powder having a crushed shape, an average particle diameter of 5 μm, and a specific gravity of 3.65.

The zinc oxide is a powder having an irregular shape, an average particle diameter of 5.0 μm, and a specific gravity of 5.61.

The aluminum nitride is a powder having a crushed shape, an average particle diameter of 15 μm, and a specific gravity of 3.26.

The boron nitride is a powder having a flake shape, an average particle diameter of 11 μm, and a specific gravity of 3.49.

Regarding the silane coupling agents, the name of the substituent contained is indicated in the tables.

The acryloyl group represents 3-acryloxypropyltrimethoxysilane, which is the acryloyl-group-containing silane coupling agent used in Sample 1.

The methacryloyl group represents 3-methacryloxypropyltrimethoxysilane, which is a methacryloyl-group-containing silane coupling agent.

The vinyl group represents vinyltrimethoxysilane, which is a vinyl-group-containing silane coupling agent.

The decyl group represents n-decyltrimethoxysilane, which is a decyl-group-containing silane coupling agent.

The isocyanate group represents 3-isocyanatopropyltriethoxysilane, which is an isocyanate-group-containing silane coupling agent.

The amino group represents 3-(2-aminoethyl)aminopropyltrimethoxysilane, which is an amino-group-containing silane coupling agent.

The mercapto group represents 3-mercaptopropyltrimethoxysilane, which is a mercapto-group-containing silane coupling agent.

The epoxy group represents glycidoxypropyltrimethoxysilane, which is an epoxy-group-containing silane coupling agent.

The anilino group represents 3-phenylaminopropyltrimethoxysilane, which is an anilino-group-containing silane coupling agent.

Regarding the raw materials described above, the average fiber length of the carbon fibers is a value measured with an electron microscope. Specifically, the lengths of 100 carbon fibers were measured with an electron microscope, and the average value thereof was determined to be the average fiber length. The average particle diameters of the flake graphite powder and the other thermally conductive fillers are volume-average particle diameters in the particle size distributions measured by a laser diffraction/scattering method (JIS R 1629).

Figure 8A:
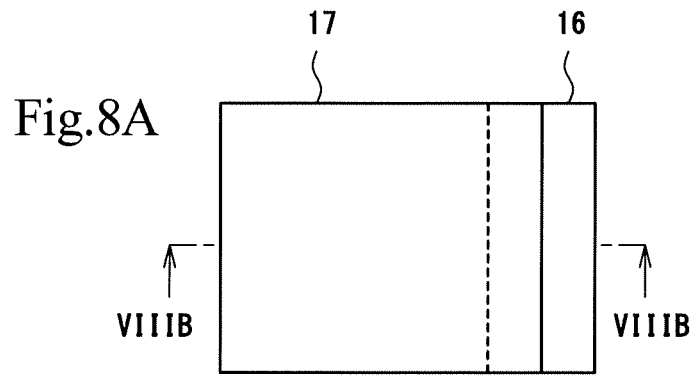
FIGS. 8A and 8B includes explanatory views illustrating a process of preparing a thermally conductive member to be subjected to an adhesive force test, Sub
Figure 8B:
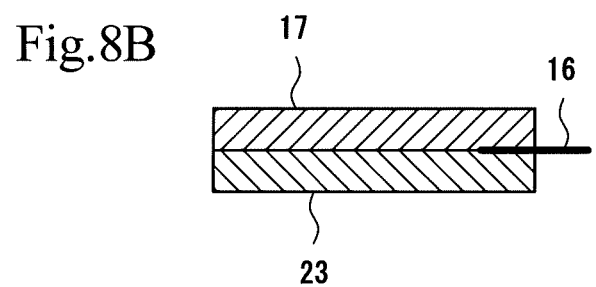
Figure 9:
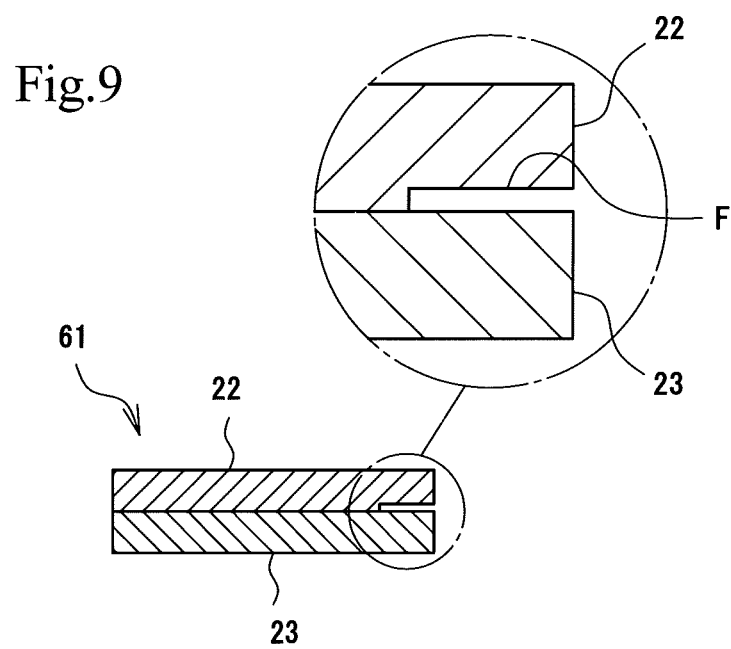
FIG. 9 is an explanatory view illustrating a thermally conductive member to be subjected to an adhesive force test and is a sectional view corresponding to Sub-FIG. 8B.

Preparation of Thermally Conductive Members of Samples 1 to 39:

A substrate (23) which is an object to be adhered (adherend) made of the material shown in the "Material of object to be adhered" in the tables and having a size of 25 mm×30 mm and a release film (16) having a size of 25 mm×10 mm and a thickness of 50 μm were prepared. As illustrated in FIG. 8, the release film (16) was superposed on one short-side side of the substrate (23) so as to partially overlap the substrate (23) from the edge by a length of 5 mm, and a thermally conductive composition (17) of each of Samples 1 to 38 was applied so as to have the same size as the substrate (23) and a thickness of 0.5 mm. The resulting product was heated at 150° C. for 30 minutes, and, after curing, the release film (16) is removed to change the thermally conductive composition (17) to a cured body (22). Thus, a thermally conductive member (61) of each of Samples 1 to 38 for evaluation, the thermally conductive member (61) being illustrated in FIG. 9, was obtained. In this thermally conductive member (61), the cured body (22) of the thermally conductive composition is fixed to the substrate (23) in a region of 25 mm×25 mm. The thermally conductive member (61) has an unfixed portion (F) in which the cured body (22) of the thermally conductive composition and the substrate (23) are separated from each other, the unfixed portion (F) extending from the edge of the substrate (23) on the one short-side side by a length of 5 mm.

Regarding the thermally conductive composition of Sample 39, a silane coupling agent diluted to 10% with methanol was applied to a surface of sheet-like graphite shown in the material of object to be adhered in Table 4 and heated at 150° C. for 30 minutes to prepare sheet-like graphite (substrate) subjected to a surface treatment. The thermally conductive composition of Sample 39 was applied to this surface-treated sheet-like graphite as in the other samples and heated at 150° C. for 30 minutes. Thus, a thermally conductive member of Sample 39 was obtained.

Properties of Samples 1 to 39:

Hardness:

Regarding the cured bodies of the thermally conductive compositions in the thermally conductive members of Samples 1 to 39, the hardness was measured with a type OO durometer in accordance with provisions of ASTM D2240. According to the results, the hardness was in the range of OO40 to 60 in each of the samples.

Figure 10:
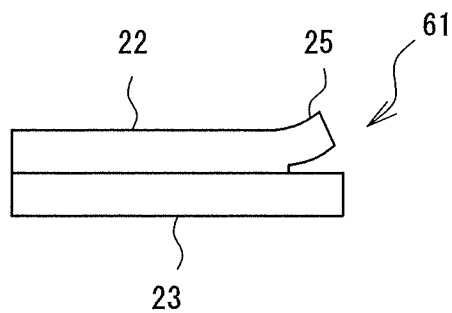
FIG. 10 is an explanatory view illustrating a state in which an adhesive force test is conducted.
Figure 11A:
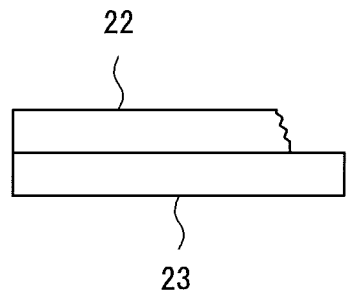
FIGS. 11A-11C includes explanatory views explaining an evaluation when an adhesive force test is conducted, Sub
Figure 11B:
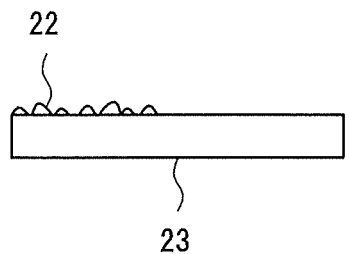
Figure 11C:
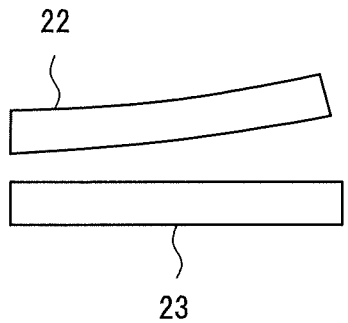

Adhesive Force:

Regarding each of the thermally conductive members (61) of Samples 1 to 39, an end (holding portion (25)) at which the cured body (22) of the thermally conductive composition is separated from the substrate (23) was held, and the cured body (22) was slowly peeled off from the substrate (23) in the vertical direction (refer to FIG. 10). Subsequently, the state of the thermally conductive member (61) was observed to evaluate the adhesive force between the cured body of the thermally conductive composition and the substrate. As illustrated in the schematic view of FIG. 11C, a sample that was cleanly separated at the interface between the cured body (22) of the thermally conductive composition and the substrate (23) was rated as "x". As illustrated in the schematic view of FIG. 11B, a sample that was separated substantially at the interface though a very small amount of the cured body (22) of the thermally conductive composition was fixed to the substrate (23) was rated as "Δ". As illustrated in the schematic view of FIG. 11A, a sample in which material failure occurred near the holding portion (25) without separation of the cured body (22) of the thermally conductive composition, and the cured body (22) of the thermally conductive composition remaining on the surface of the substrate (23) could be scraped off with a spatula was rated as "○". A sample in which material failure occurred near the holding portion (25) without separation of the cured body (22) of the thermally conductive composition, and the cured body (22) of the thermally conductive composition remaining on the surface of the substrate (23) could not be scraped off with a spatula was rated as "⊙". The results are shown in the "Evaluation results of adhesive force" in the tables.

Consideration:

In Sample 4, in which aluminum hydroxide was used as the thermally conductive filler, and Sample 5, in which magnesium hydroxide was used as the thermally conductive filler, the evaluation of the adhesive force was "⊙". In contrast, in Samples 1 to 3 and Samples 6 to 10, in which the type of the thermally conductive filler was changed to thermally conductive fillers other than the above, the adhesive force was rated as "x". This shows that the use of metal hydroxides as the thermally conductive fillers achieves high adhesive forces, which were good results, whereas the use of flake graphite, a metal powder, metal oxide powders, and metal nitride powders does not exhibit required adhesive forces.

In Sample 29, in which the amount of aluminum hydroxide blended was 60 parts by mass, and Sample 30, in which the amount of aluminum hydroxide blended was 560 parts by mass relative to 100 parts by mass of the addition-reaction-type silicone, the evaluation of the adhesive force was "⊙". In Sample 31, in which the amount of aluminum hydroxide blended was 950 parts by mass, the evaluation of the adhesive force was "○". Regarding the ratio of the volume of the thermally conductive filler to the total volume of the thermally conductive composition, Sample 29 has a ratio of 20% by volume, Sample 30 has a ratio of 70% by volume, and Sample 31 had a ratio of 80% by volume. Accordingly, these results show that a predetermined adhesive force is obtained when the amount of the thermally conductive filler added is in the range of 20% to 80% by volume, and that particularly high adhesive force is obtained in the range of 20% to 70% by volume.

Regarding Samples 11 to 19, aluminum hydroxide, which is a thermally conductive filler that is expected to enhance the adhesive force, and aluminum oxide, which is a thermally conductive filler that is not expected to enhance the adhesive force, were blended, and the blending ratio was changed. The adhesive force of each of Samples 11 to 19 was evaluated. In Sample 11, in which 92.88 parts by mass of aluminum hydroxide and 16.77 parts by mass of aluminum oxide were blended, and the amount of aluminum hydroxide relative to a total amount of the thermally conductive filler, the total amount being the amount of these mixed, corresponded to 90% by volume, the adhesive force was rated as "⊙". On the other hand, in Sample 12, in which the amount of aluminum hydroxide corresponded to 80% by volume, the adhesive force was rated as "○". In Samples 13 to 19, in which the amount of aluminum hydroxide corresponded to 70% by volume or less, the adhesive force was rated as "x". These results show that when a metal hydroxide is contained in an amount of at least 80% by volume relative to the total volume of the thermally conductive filler, the desired adhesive force can be exhibited.

Regarding Sample 20, in which the addition-reaction-type polyisobutylene was used without using the addition-reaction-type silicone, the evaluation of the adhesive force was "x". This shows that the desired adhesive force cannot be obtained with the addition-reaction-type polyisobutylene.

Regarding Samples 21 to 28, in which other functional-group-containing silane coupling agents were used instead of the acryloyl-group-containing silane coupling agent, the evaluation of the adhesive force was "x" in all the samples except that the evaluation of the adhesive force was "Δ" in Samples 21 and 24, in which the methacryloyl-group-containing silane coupling agent and the isocyanate-group-containing silane coupling agent were used, respectively. These results show that the use of silane coupling agents other than the acryloyl-group-containing silane coupling agent does not provide sufficient adhesive force.

Regarding Samples 32 to 35, in which the amount of the silane coupling agent blended was changed, the evaluation of the adhesive force was "⊙" in Samples 33 and 34, in which the amount blended was 0.15 parts by mass and 0.6 parts by mass, respectively. On the other hand, in Sample 32, in which the amount blended was reduced to 0.1 parts by mass, and Sample 35, in which the amount blended was increased to 0.8 parts by mass, the adhesive force was somewhat weakened, and the evaluation of the adhesive force was "○". These results show that particularly high adhesive force is obtained when the amount of the acryloyl-group-containing silane coupling agent blended is in the range of 0.15 to 0.6 parts by mass.

In each of Samples 36, 37, and 38, in which the substrate serving as an object to which the thermally conductive composition was fixed was changed from graphite to aluminum, stainless steel, and copper, respectively, the evaluation of the adhesive force was "⊙". These results show that the thermally conductive composition of Samples 36 to 38 exhibits high adhesive force to metals and graphite regardless of the type of the substrate.

As in the thermally conductive member of Sample 39, when a surface of the substrate was merely treated with an acryloyl-group-containing silane coupling agent instead of blending an acryloyl-group-containing silane coupling agent in the preparation of the thermally conductive composition, the evaluation of the adhesive force was "x". This shows that even when an acryloyl-group-containing silane coupling agent is used as an adhesive layer or a primer layer, the desired adhesive force is not obtained, and that it is necessary to blend the acryloyl-group-containing silane coupling agent in the preparation of the thermally conductive composition.

The embodiments and examples described above are merely illustrative examples of the present invention, and, for example, modifications of the embodiments and the examples, addition of the known art, and combination with the known art are possible without departing from the gist of the present invention. Such technical features are also covered in the scope of the present invention.

REFERENCE SIGNS LIST 11, 11a, 11b, 11c, 21, 31, 41, 51, 61 thermally conductive member
12, 12a, 12b, 22 cured body of thermally conductive composition
13, 23 adherend (object to be adhered, substrate)
   13a metal sheet
   13b heat sink
   13c graphite sheet
   13d heat-generating element
   13e heat-diffusing member
14 case (housing)
15 protective member
16 release film 17 thermally conductive composition
25 holding portion
C covering portion
E end portion
F unfixed portion

The invention claimed is:

1. A thermally conductive composition, comprising:
a mixture containing an addition-reaction-type silicone;
a thermally conductive filler; and
an acryloyl-group-containing silane coupling agent,
wherein the amount of the thermally conductive filler is in the range of 20% to 80% by volume,
wherein the thermally conductive filler includes a metal hydroxide in an amount of 80% by volume or more of the thermally conductive filler, and
wherein the acryloyl-group-containing silane coupling agent is contained in a ratio of 0.1 to 0.8 parts by mass relative to 100 parts by mass of the addition-reaction-type silicone.

2. The thermally conductive composition according to claim 1, wherein a cured body of the mixture has a hardness of 60 or less in terms of OO-hardness specified in ASTM D2240.

3. The thermally conductive composition according to claim 1, wherein the acryloyl-group-containing silane coupling agent is contained in a ratio of 0.15 to 0.6 parts by mass relative to 100 parts by mass of the addition-reaction-type silicone.

4. A thermally conductive member comprising a cured body of the thermally conductive composition according to claim 1 and an adherend to which the cured body is fixed.

5. The thermally conductive member according to claim 4, wherein the cured body of the thermally conductive composition has a thin plate-like shape.

6. The thermally conductive member according to claim 4, wherein the cured body of the thermally conductive composition is formed to be larger than a fixing surface of the adherend.

7. The thermally conductive member according to claim 4, wherein the cured body of the thermally conductive composition has a covering portion that covers an end portion of the adherend.

8. The thermally conductive member according to claim 4, wherein the cured body of the thermally conductive composition covers an entire surface of the adherend.

9. The thermally conductive member according to claim 4, wherein the adherend is a heat-dissipating element or heat-diffusing member that is made of graphite, aluminum, copper, or stainless steel.

10. A method for producing a thermally conductive composition, the method comprising:
mixing an addition-reaction-type silicone, a thermally conductive filler that includes a metal hydroxide in an amount of 80% by volume or more of the thermally conductive filler, and an acryloyl-group-containing silane coupling agent to produce a thermally conductive composition,
wherein the amount of the thermally conductive filler is in the range of 20% to 80% by volume relative to the total volume of the thermally conductive composition, and
wherein the acryloyl-group-containing silane coupling agent is contained in a ratio of 0.1 to 0.8 parts by mass relative to 100 parts by mass of the addition-reaction-type silicone.

* * * * *